United States Patent
Mirza et al.

(10) Patent No.: US 10,915,359 B2
(45) Date of Patent: Feb. 9, 2021

(54) VARIABLE LATENCY REQUEST ARBITRATION

(71) Applicant: ATI Technologies ULC, Markham (CA)

(72) Inventors: Jimshed B. Mirza, Markham (CA); Qian Ma, Markham (CA); Leon King Nok Lai, Markham (CA)

(73) Assignee: ATI Technologies ULC, Markham (CA)

( * ) Notice: Subject to any disclaimer, the term of this patent is extended or adjusted under 35 U.S.C. 154(b) by 85 days.

(21) Appl. No.: 16/195,412

(22) Filed: Nov. 19, 2018

(65) Prior Publication Data

US 2020/0159581 A1 May 21, 2020

(51) Int. Cl.
*G06F 9/50* (2006.01)

(52) U.S. Cl.
CPC .................. *G06F 9/5011* (2013.01)

(58) Field of Classification Search
CPC .................................................... G06F 9/5011
USPC .................................................... 718/1–108
See application file for complete search history.

(56) References Cited

U.S. PATENT DOCUMENTS

| | | | | |
|---|---|---|---|---|
| 2008/0235693 A1* | 9/2008 | Proctor | ................. | G06F 9/4881 718/103 |
| 2008/0259947 A1* | 10/2008 | Krishnamurthy | ....... | H04L 47/50 370/412 |
| 2014/0052882 A1* | 2/2014 | Waters | .................. | G06F 9/4843 710/267 |
| 2017/0011544 A1* | 1/2017 | Clohset | ................. | G06T 15/005 |
| 2018/0253334 A1* | 9/2018 | Rimoni | ................. | G06F 3/0601 |

OTHER PUBLICATIONS

Bianco, Andrea, Marcella Guido, and Emilio Leonardi. "Incremental scheduling algorithms for WDM/TDM networks with arbitrary tuning latencies." IEEE transactions on communications 51.3 (2003): pp. 464-475. (Year: 2003).*

Pilato, Christian, et al. "A runtime adaptive controller for supporting hardware components with variable latency." 2011 NASA/ESA Conference on Adaptive Hardware and Systems (AHS). IEEE, 2011.pp. 153-160 (Year: 2011).*

Jog, Adwait, et al. "OWL: cooperative thread array aware scheduling techniques for improving GPGPU performance." ACM SIGPLAN Notices 48.4 (2013): pp. 395-406. (Year: 2013).*

(Continued)

*Primary Examiner* — Satish Rampuria
(74) *Attorney, Agent, or Firm* — Volpe Koenig (57) ABSTRACT

A technique for scheduling processing tasks having different latencies is provided. The technique involves identifying one or more available requests in a request queue, where each request queue corresponds to a different latency. A request arbiter examines a shift register to determine whether there is an available slot for the one or more requests. A slot is available for a request if there is a slot that is a number of slots from the end of the shift register equal to the number of cycles the request takes to complete processing in a corresponding processing pipeline. If a slot is available, the request is scheduled for execution and the slot is marked as being occupied. If a slot is not available, the request is not scheduled for execution on the current cycle. On transitioning to a new cycle, the shift register is shifted towards its end and the technique repeats.

20 Claims, 8 Drawing Sheets

(56) References Cited

OTHER PUBLICATIONS

Duda, Kenneth J., and David R. Cheriton. "Borrowed-virtual-time (BVT) scheduling: supporting latency-sensitive threads in a general-purpose scheduler." ACM SIGOPS Operating Systems Review 33.5 (1999): pp. 261-276. (Year: 1999).*
Nasri, Wahid, and Wafa Nafti. "A new DAG scheduling algorithm for heterogeneous platforms." 2012 2nd IEEE International Conference on Parallel, Distributed and Grid Computing. IEEE, 2012. pp. 114-119 (Year: 2012).*
Li, Hon F. "Scheduling trees in parallel/pipelined processing environments." IEEE transactions on computers 11 (1977): pp. 1101-1112. (Year: 1977).*

* cited by examiner

VARIABLE LATENCY REQUEST ARBITRATION

BACKGROUND

Computing devices often include "merged" processing pipelines that accept a fixed number of requests and output a fixed number of request results per cycle. These merged processing pipelines may process different types of requests, each with different latencies, where "latency" defines the number of cycles the request takes to process. Some examples of such merged pipelines include arithmetic logic units that accept requests to process instructions, where the instructions may take a different number of cycles to complete. These types of pipelines present scheduling challenges in that if designed incorrectly, different requests may be processed inefficiently.

BRIEF DESCRIPTION OF THE DRAWINGS

A more detailed understanding can be had from the following description, given by way of example in conjunction with the accompanying drawings wherein.

DETAILED DESCRIPTION

A technique for scheduling processing tasks having different latencies is provided. The technique involves identifying one or more available requests in a request queue, where each request queue corresponds to a different latency. A request arbiter examines a shift register to determine whether there is an available slot for the one or more requests. A slot is available for a request if there is a slot that is a number of slots from the end of the shift register equal to the number of cycles the request takes to complete processing in a corresponding processing pipeline. If a slot is available, the request is scheduled for execution and the slot is marked as being occupied. If a slot is not available, the request is not scheduled for execution on the current cycle. On transitioning to a new cycle, the shift register is shifted towards its end and the technique repeats. Although described herein as being used in the context of an accelerated processing device, the arbitration techniques provided herein could be used for any "merged" computing pipeline with two different data paths that have different latencies.

Figure 1:
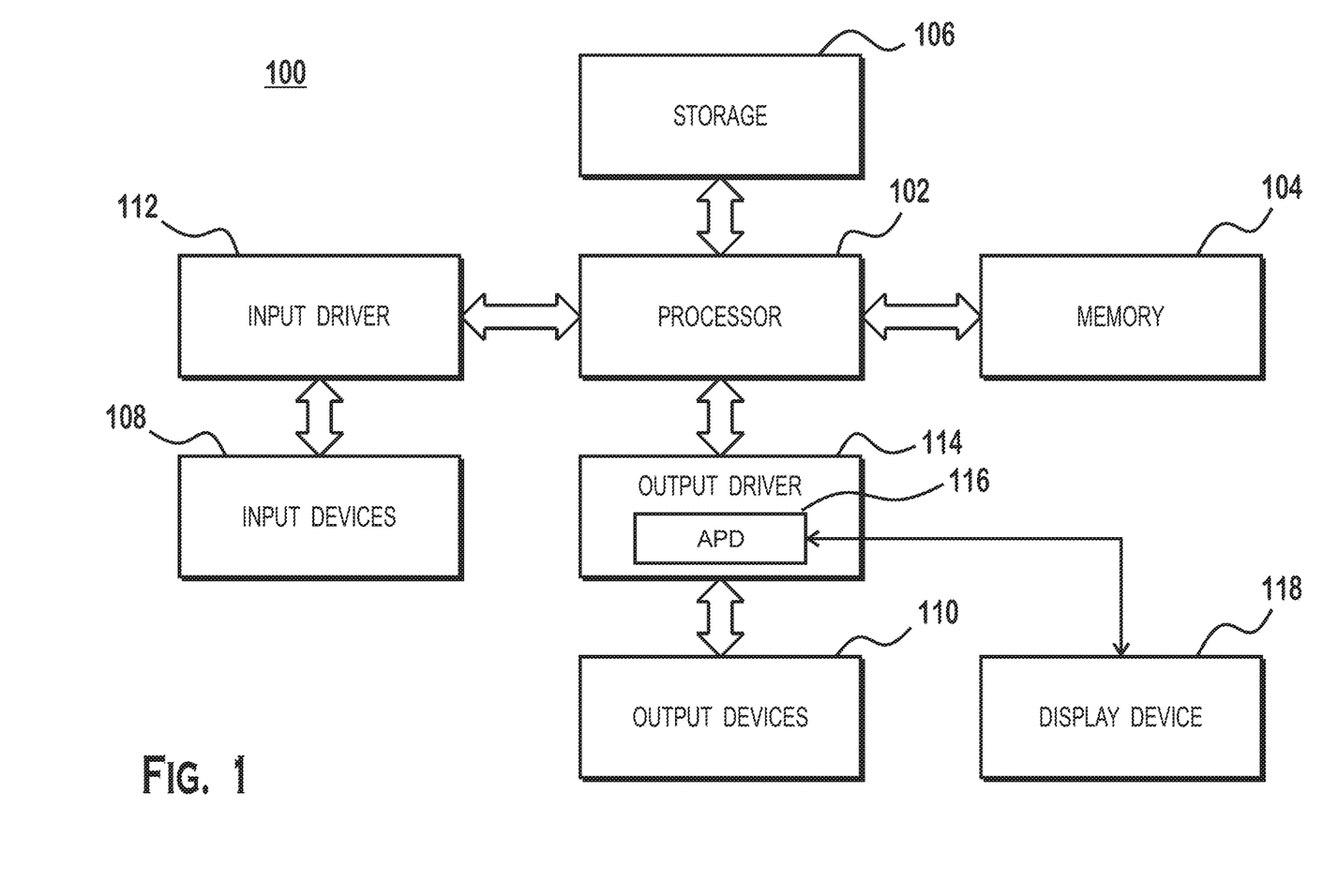
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118.

Figure 2:
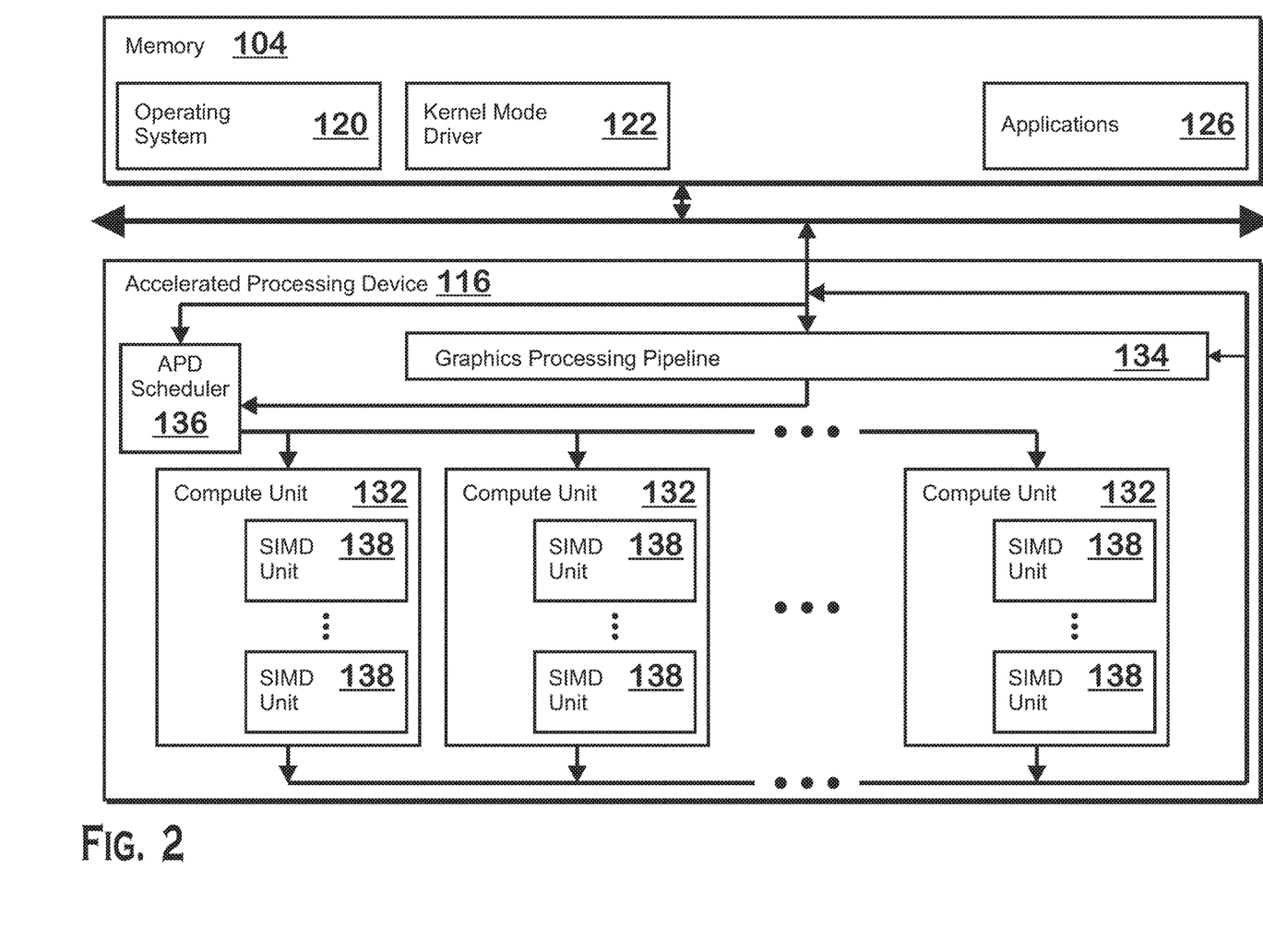
FIG. 2 illustrates details of the device of FIG. 1, according to an example.

FIG. 2 illustrates details of the device 100 and the APD 116, according to an example. The processor 102 (FIG. 1)

executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
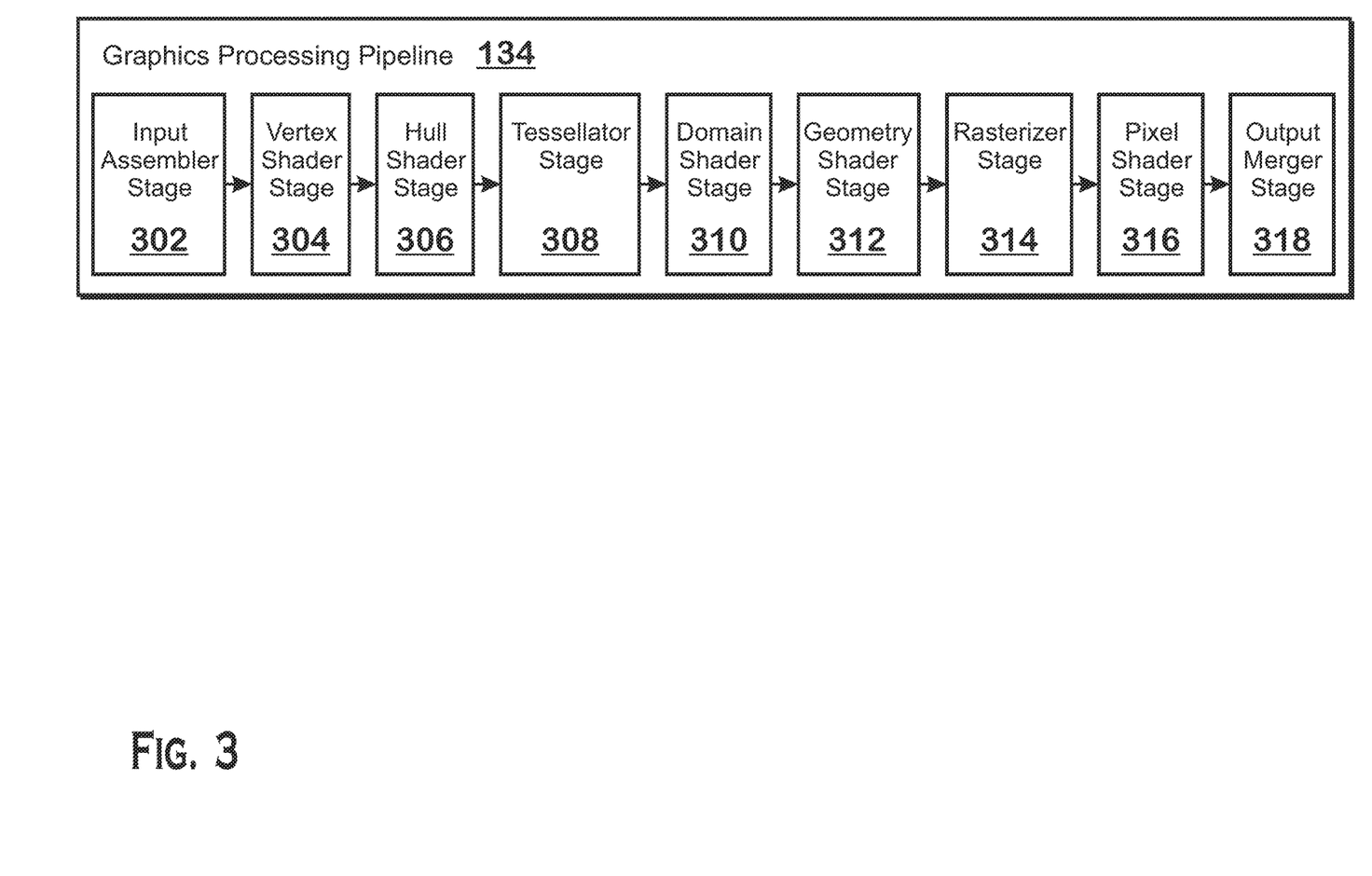
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

It is possible for various units of the graphics processing pipeline 134, such as the pixel shader stage 316, or other parts, to send requests to access data of different compression types, where "compression type" means either compressed or not compressed. If such a unit that accesses data is unaware of the compression type of the data requested by that unit, then some intermediary processes the requests from the unit to determine the compression type of the target and then to access the data appropriately based on the compression type. In an example, the request type is a read operation. The intermediary determines whether the access targets compressed data. If the access targets compressed data, then the intermediary retrieves the compressed data, decompresses the data, and provides the decompressed data to the requesting unit. If the access does not target compressed data, then the intermediary retrieves the uncompressed data and returns that data to the requesting unit.

In one example, whether data is compressed or not is designated on a surface-by-surface basis. Each surface is a render target, which is a block of memory to which final output of the graphics processing pipeline 134 is written. Example surfaces include textures and the frame buffer (which, for example, is sometimes used to output data to a display device for display). Note, however, that because a specific compression algorithm may or may not be able to reduce the size of any particular unit of data, different units of data in a compressed surface may be either compressed or uncompressed. A compressed surface is still termed "compressed" herein, as long as that surface is designated as being capable of storing at least some compressed units of data, even if other units of data in that surface are not actually compressed due to the compression algorithm being unable to reduce their size.

Figure 4:
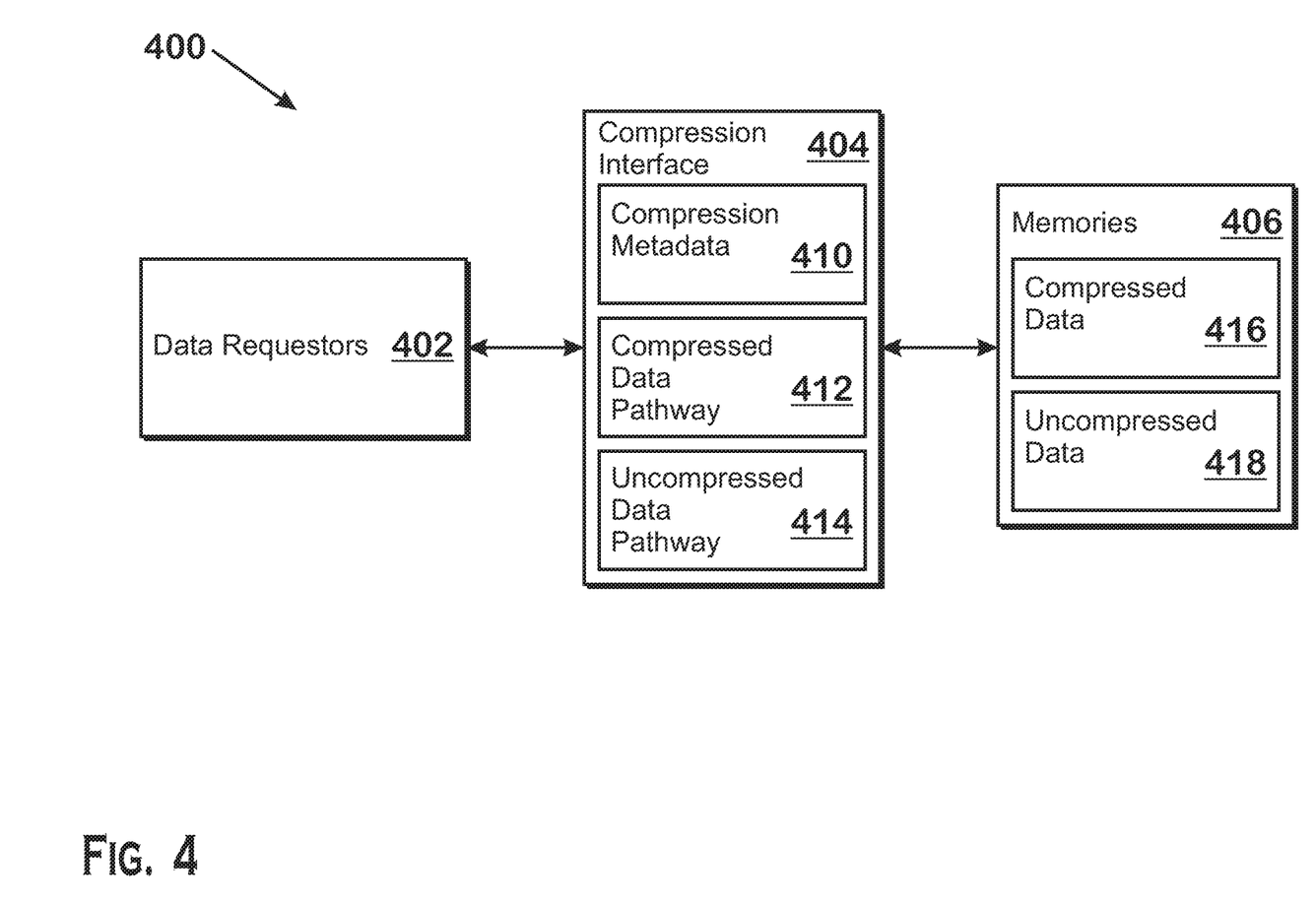
FIG. 4 is a block diagram of a compressed memory system, according to an example.

FIG. 4 is a block diagram of a compressed memory system 400, according to an example. As shown, the system includes data requestors 402, a compression interface 404, and memories 406. The data requestors 402 include one or more units (such as units of the graphics processing pipeline 134, including the pixel shader stage 316) that at times access either or both of compressed surfaces or uncompressed surfaces. The data requestors 402 make such accesses through a compression interface 404. The compression interface includes compression metadata 410, a compressed data pathway 412, and an uncompressed data pathway 414. The memories 406 include memory accessible to the data requestors 402 via the compression interface 404. The memories 406 may include cache memories, system memories, or other types of memory. The memories 406 include compressed data 416 and uncompressed data 418. In the terms "compressed data 416," and "uncompressed data 418," the term "data" includes "surfaces." As described above, it is not necessary that all units of data in the compressed data 416 are compressed, as some units of data would, when a compression algorithm is applied, have a greater amount of information than the uncompressed version. Thus the compressed data 416 is capable of including (and typically does include) at least some data units that are compressed and some data units that are not compressed.

In operation, the data requestors 402 issue data access requests to the memories 406 via the compression interface 404. The compression interface 404 examines the compression metadata 410, which stores information indicating which portions of memories 406 are considered compressed data 416 and which portions of memories 406 are considered uncompressed data 418. The compression interface 404 determines, based on the compression metadata 410, whether the data access requests are directed to compressed data 416 or uncompressed data 418. If a data access request is directed to compressed data, then the compressed data pathway 412 processes the request. If a data access request is directed to uncompressed data, then the uncompressed data pathway 414 processes the request.

The compressed data pathway 412 operates in the following manner. For read requests, the compressed data pathway 412 reads the data specified by the request from a compressed data 416 in the memories 406. The compressed data pathway 412 also examines the compression metadata 410 to determine whether the data read is actually compressed, or is only stored in the compressed data 416 in an uncompressed format (as described above). If the data is actually compressed, then the compressed data pathway 412 decompresses the data and returns the data to the data requestors 402. If the data is not compressed, then the compressed data pathway 412 returns the data to the data requestors 402. The uncompressed data pathway 414 simply retrieves requested data from uncompressed data 418 and returns that data to the data requestor 402.

The compressed data pathway 412 and the uncompressed data have different latencies, where an operation having a higher latency than another operation having a lower latency means that the operation having the higher latency takes a larger number of clock cycles to complete than the operation having the lower latency. Operations through the compressed data pathway 412 (the operation described above) have higher latency than operations through the uncompressed data pathway 414.

The differences in latency between the compressed data pathway 412 and the uncompressed data pathway 414 mean that, if the compression interface 404 simply processed requests from data requestors 402 in a first-in-first-out manner, requests processed through the low latency uncompressed data pathway 414 could be complete but required to wait for requests through the high latency compressed data pathway 412. This type of operation would be inefficient. For this reason, an alternate technique for processing requests from the data requestors 402 is provided herein.

Figure 5:
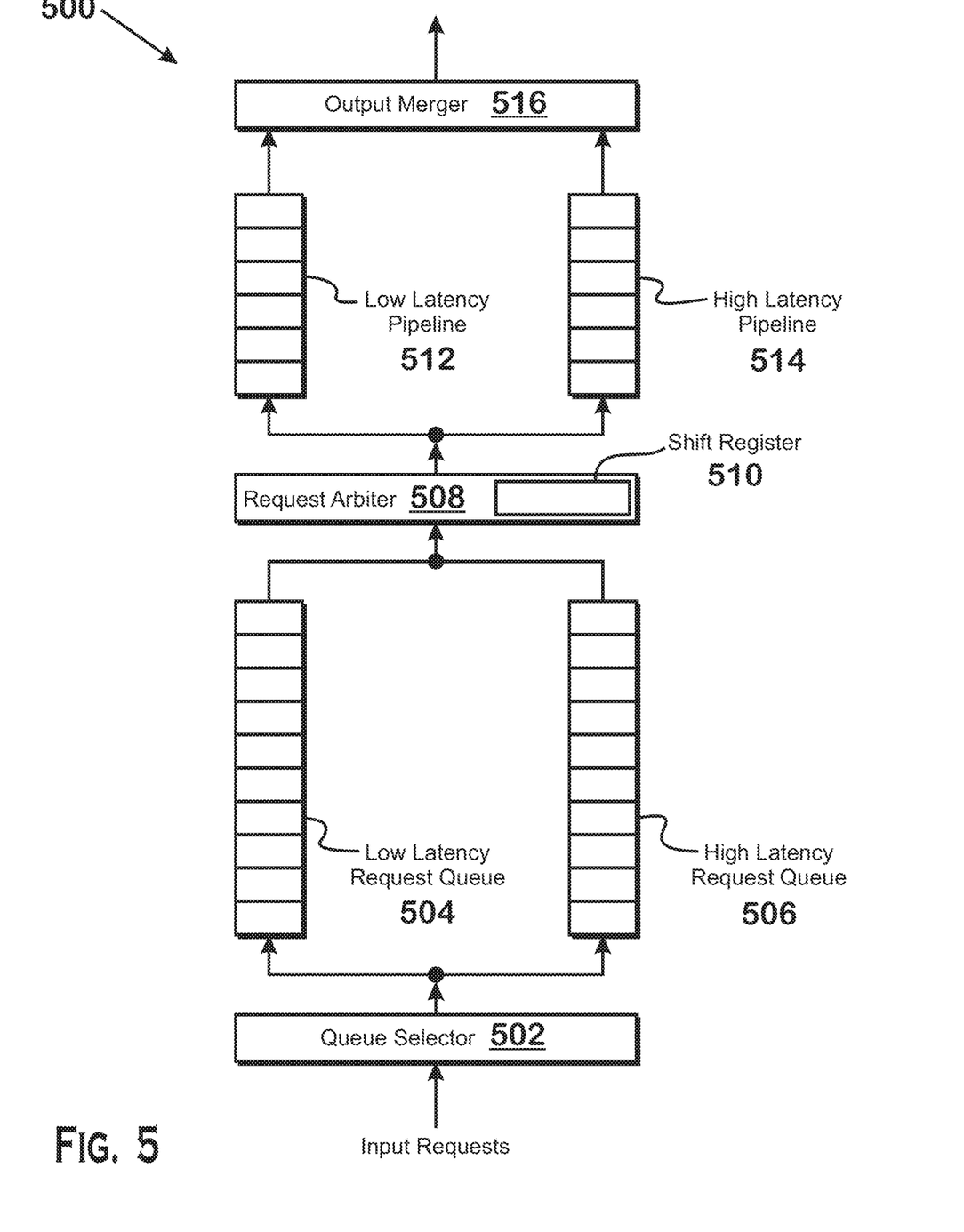
FIG. 5 is a block diagram of a variable latency request arbiter, according to an example.

FIG. 5 is a block diagram of a variable latency request arbiter 500, according to an example. The variable latency request arbiter 500 includes queue selector 502, a low latency request queue 504, a high latency request queue 506, a request arbiter 508, which includes a shift register 510, a low latency pipeline 512, a high latency pipeline 514, and an output merger 516.

The queue selector 502 examines incoming requests and determines whether a request should be placed in the low latency request queue 504 or the high latency request queue 506. A request for uncompressed data 418 is a low latency request and therefore the queue selector 502 places such requests in the low latency request queue 504. A request for compressed data 416 is a high latency request and therefore the queue selector 502 places such requests in the high latency request queue 506.

In any given clock cycle, the request arbiter 508 selects requests from none, either, or both of the low latency request queue 504 and the high latency request queue 506, based on the contents of the shift register 510, to place into the low latency pipeline 512 and/or the high latency pipeline 514. The shift register 510 tracks the progress of requests through both the low latency pipeline 512 and the high latency pipeline 514. When either the low latency pipeline 512 or the high latency pipeline 514 has completed a request, that pipeline outputs the result of the request to the output merger 516, which provides the result to the requesting unit or to some other unit as specified by the request.

The variable latency request arbiter 500 accepts requests at the same rate as the variable latency request arbiter 500 outputs results for those requests. In an example, the queue selector 502 receives one input request per cycle and outputs the result of one request per cycle. Put differently, the output merger 516 has a maximum number of request results that can be output per cycle. In one example, this maximum number is one.

To prevent a conflict that would occur if requests in the low latency pipeline 512 and the high latency pipeline 514 complete on the same cycle, the request arbiter 508 schedules requests to be executed on those pipelines based on the contents of the shift register 510 and on the number of cycles that the different requests take to complete. The shift register 510 stores an indication of each request that is being processed in the low latency pipeline 512 and the high latency pipeline 514. Each cycle, the shift register 510 shifts all of its contents over by one spot. When a request is available in the low latency request queue 504 or the high latency request queue 506, the request arbiter 508 examines the shift register 510 to determine whether there is a slot available for a request. A slot is available for a request if the slot that is a number of places from the end of the shift register 510 equal to the number of cycles that the request takes to complete in the low latency pipeline 512 or the high latency pipeline 514. In an example, a request takes 5 cycles to complete in the high latency pipeline 514. If a request is available in the high latency request queue 506, and the slot corresponding to an instruction being output 5 cycles later (i.e., a slot that is five places from the end of the shift register) is empty in the shift register 510, then the request arbiter 508 transfers that request to the high latency pipeline 514. In the example, a request takes 3 cycles to complete in the low latency pipeline 512 for processing and places an entry corresponding to that request in that empty spot in the shift register 510. If a request is available in the low latency request queue 504, and the slot corresponding to an instruction being output 3 cycles later is empty in the shift register 510, then the request arbiter 508 transfers that request to the low latency pipeline 512. It is possible for the request arbiter 508 to transfer a low latency request to the low latency pipeline 512 in the same cycle that the request arbiter transfers a high latency request to the high latency pipeline 514, as long as the corresponding slots in the shift register 510 are open.

The low latency pipeline 512 and high latency pipeline 514 process requests according to their architectures, completing in a known number of cycles. Because of the manner in which the request arbiter 508 schedules the requests for execution in the pipelines, requests from different pipelines do not complete on the same cycle. Thus no conflict occurs at the output merger 516, which is therefore able to simply select an available result from one of the pipelines if any result is available.

In some implementations, the variable latency request arbiter 500 is included within the compression interface 404. In such implementations, the compressed data pathway 412 is the high latency pipeline 514 and the uncompressed data pathway 414 is the low latency pipeline 512. Other elements of the variable latency request arbiter 500 are not illustrated in FIG. 4. In implementations where the variable latency request arbiter 500 is included within the compression interface 404, the different request queues (low latency request queue 504 and high latency request queue 506) correspond to different request types of compressed request types and non-compressed request types. Specifically, a request to access uncompressed data is placed into the low latency request queue 504 and a request to access compressed data is placed into the high latency request queue 506. The request arbiter selects, for processing in either the low latency pipeline 512 or the high latency pipeline 514, requests from either request queue based on the techniques set forth herein.

Although described in the context of processing requests to access compressed or uncompressed data in an APD 116, it should be understood that the architecture of FIG. 5 could be used in a wide variety of contexts. Each such context would have the following characteristics. Requests (or commands, instructions, or the like) having different latencies are to be processed. The requests are input and output to a request processor (e.g., the variable latency request arbiter 500) at the same rate (such as one request per cycle—in other words, one request is input per cycle and one request is output per cycle).

Although described as processing two request types (low and high latencies), a variable latency request arbiter 500 may be able to process any number of request types. For more than two request types (where each request type is associated with a different pipeline), the variable latency request arbiter 500 would include a number of request queues equal to the number of types. The request arbiter 508 would determine whether a request is available in one of the queues, and would determine whether to place the request in a corresponding processing pipeline based on the contents of the shift register 510. Specifically, for any particular request type, the request arbiter 508 would check the slot of the shift register 510 at a location dependent on the number of cycles the request would take to complete. If empty, the request arbiter 508 would transmit the request to the corresponding pipeline for processing and place an indication of the request in the shift register 510. If not empty, the request arbiter 508 would not transmit that request. In addition, the individual pipelines may have variable latency, for example, dependent on the request type, pipeline state, or any other factor. In such scenarios, when the request arbiter 508 examines the shift register 510 to determine whether a request should be placed in a pipeline, the request arbiter 508 examines the slot corresponding to the latency for the request.

An example of the operations described herein is provided with respect to FIGS. 6A-6H. A reduced version of the variable latency request arbiter 500, illustrating only the request queues and the pipelines, is provided in these figures for clarity. The variable latency request arbiter 500 receives the following requests: H1, H2, L3, H4, L5, and L6. The first character of the request, which is "H" or "L," indicates whether the request is a high latency request or a low latency request. The second character, a numeral, is the order in which the variable latency request arbiter 500 receives the request. The queue selector 502, which is not shown in FIG. 6A-6H, places these requests in either the high latency request queue 506 or the low latency request queue 504, based on whether the request is a high latency request or a low latency request. The requests are placed in the request queues in order, with the earlier requests the being closer to the head of the queue than the later requests.

Figure 6A:
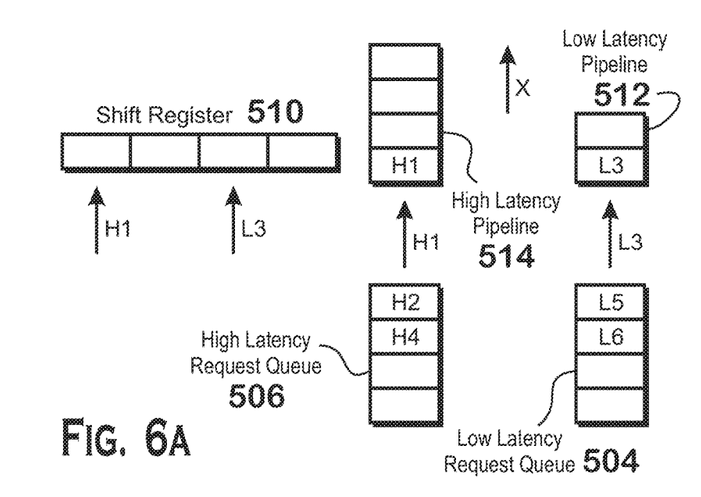
FIGS. 6A-6H illustrate an example of request arbitration and scheduling.

Prior to FIG. 6A, requests H1, H2, and H4 were in the high latency request queue 506 and requests L3, L5, and L6 were in the low latency request queue 504. In FIG. 6A, the request arbiter 508 notes that there is a request (H1) available in the high latency request queue 506 and a request (L3) available in the low latency request queue 504. For H1, the request arbiter 508 checks the shift register at a position that is a number of slots away from the end (the right end in the figures) of the shift register 510 equal to the number of cycles that the high latency pipeline 514 takes to complete a request. In the example, this number is 4. Noting that this slot is empty, the request arbiter 508 forwards H1 for execution in the high latency pipeline 514 and also inserts an indication of H1 into that slot in the shift register 510. In addition, the request arbiter 508 checks the shift register 510 at a position that is a number of slots away from the end equal to the number of cycles that the low latency pipeline 512 takes to complete a request (which in this example is two cycles). Detecting that this slot is empty, the request arbiter 508 forwards request L3 to the low latency pipeline 512 and inserts an indicator of that request into the corresponding slot in the shirt register 510 (the slot a number of slots away from the end equal to the number of cycles that the low latency request would take in the low latency pipeline 512-2).

Figure 6B:
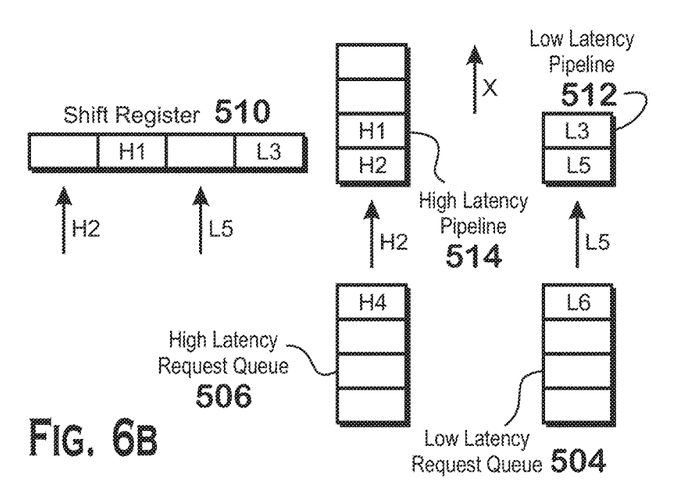

The next cycle is illustrated in FIG. 6B. At this step, the contents of the shift register 510 have been shifted to the right by one place (which happens every cycle). The request arbiter 508 notes that a high latency request—H2 is available in the high latency request queue 506 and that a low latency request—L5—is available in the low latency request queue 506. The request arbiter 508 notes that the slot in the shift register 510 corresponding to the high latency request is empty and thus schedules H2 in the high latency pipeline 514 and places an indication of H2 in the shift register 510 at the corresponding slot (slot 4). Similarly, the request arbiter 508 notes that the slot in the shift register 510 corresponding to the low latency request is empty and thus schedules L5 in the low latency pipeline 512 and places an indication of L5 in the shift register 510 at the corresponding slot (slot 2).

Figure 6C:
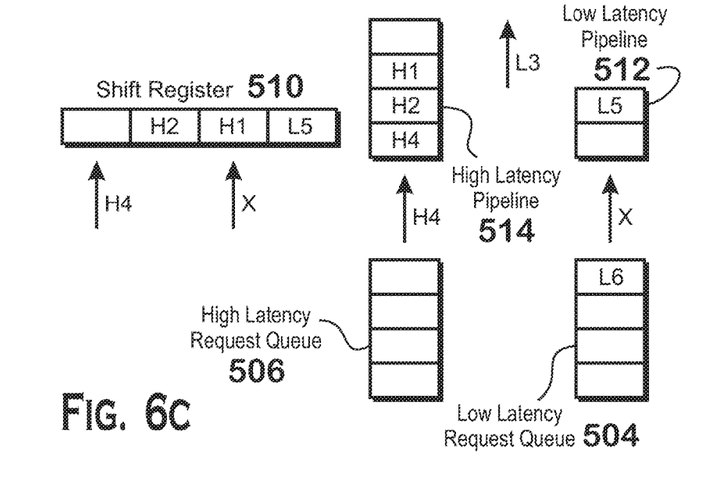

The next cycle is illustrated in FIG. 6C. At this step, the contents of the shift register 510 have again been shifted to the right by one place. The request arbiter 508 notes that a high latency request—H4 is available in the high latency request queue 506 and that a low latency request—L6—is available in the low latency request queue 506. The request arbiter 508 notes that the slot in the shift register 510 corresponding to the high latency request is empty and therefore forwards the request H4 for execution in the high latency pipeline 514 and inserts an entry corresponding to H4 into slot 4 in the shift register 510. For request L6, the request arbiter 508 notes that the corresponding slot in the shift register 510 is occupied (by H1) and thus does not forward L6 to the low latency pipeline 512 for execution and does not write an indication of L6 into the shift register 510. Request L6 thus waits to be executed at a later cycle. Note, L3 completes its execution in the low latency pipeline 512 in this cycle and its result is output.

Figure 6D:
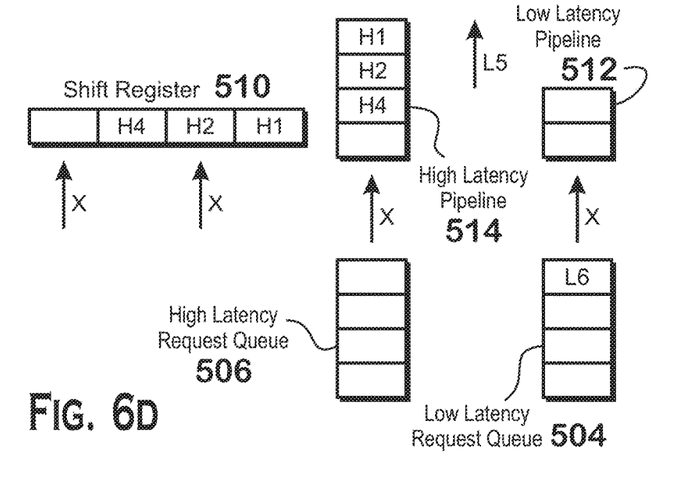

The next cycle is illustrated in FIG. 6D. Here, there are no more high latency requests in the high latency request queue 506, but L6 still exists in the low latency request queue 504. However, the request arbiter 508 does not schedule L6 for execution in the low latency pipeline because the corresponding slot in the shift register 510 is not empty (that slot contains H2). At this cycle, L5 is complete and its result is output.

Figure 6E:
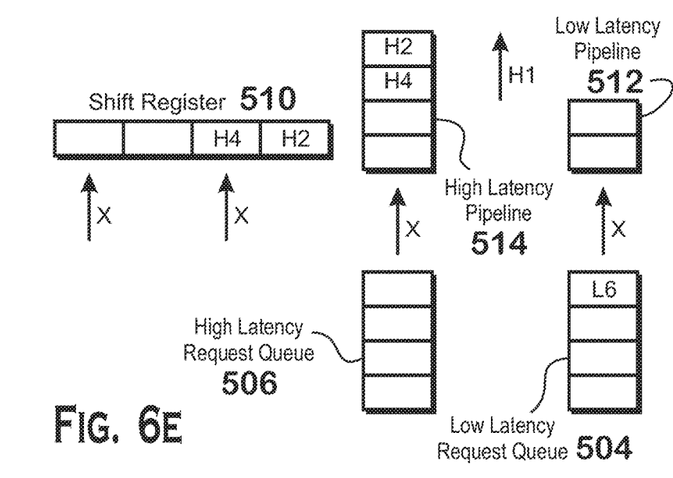
Figure 6F:
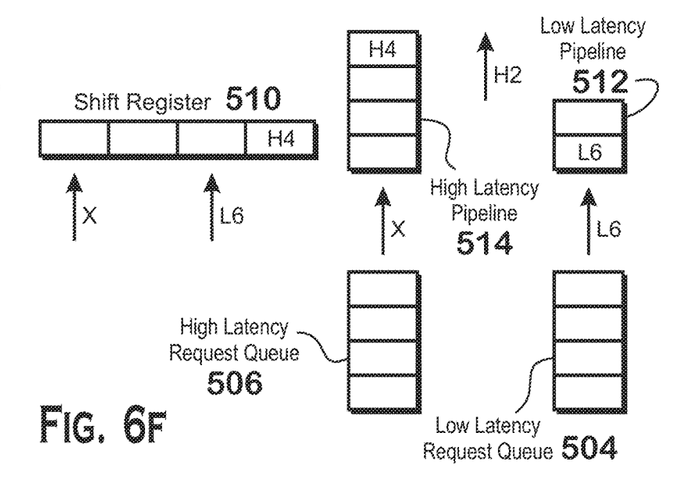
Figure 6G:
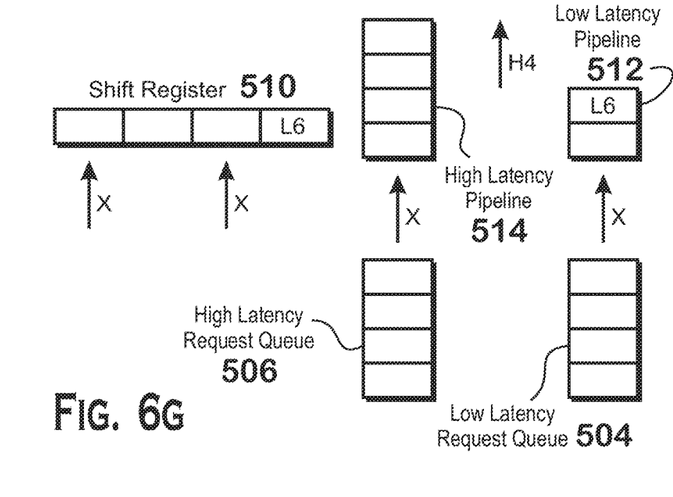
Figure 6H:
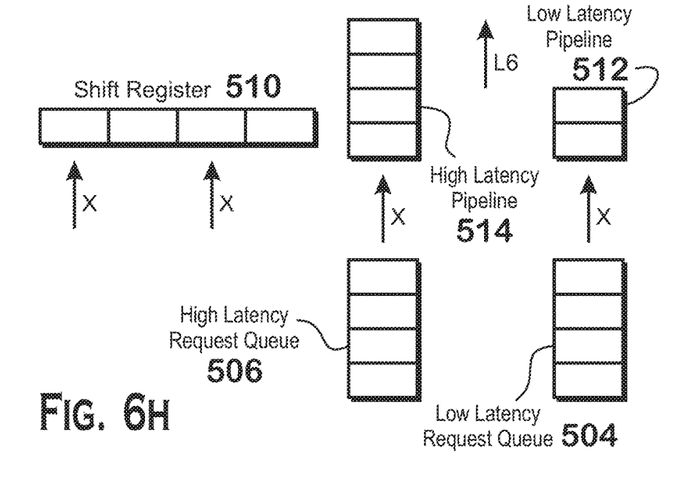

The next cycle is illustrated in FIG. 6E. Here, the request arbiter 508 still does not schedule L6 for execution because the slot in the shift register 510 is not empty (that slot contains H4). H1 completes execution in this cycle. In FIG. 6F, the request arbiter 508 does schedule L6 for execution because the slot in the shift register 510 is empty. H2 completes execution in this cycle. In FIG. 6G, there are no more requests waiting to be scheduled. H4 completes execution and is output. In FIG. 6H, L6 completes execution and is output. Note that, by virtue of operation of the shift register 510, there is no cycle in which a request from the high latency pipeline 514 and a request form the low latency pipeline 512 are complete and ready to be output. In other words, there is no conflict at the output of the variable latency request arbiter 500.

Figure 7:
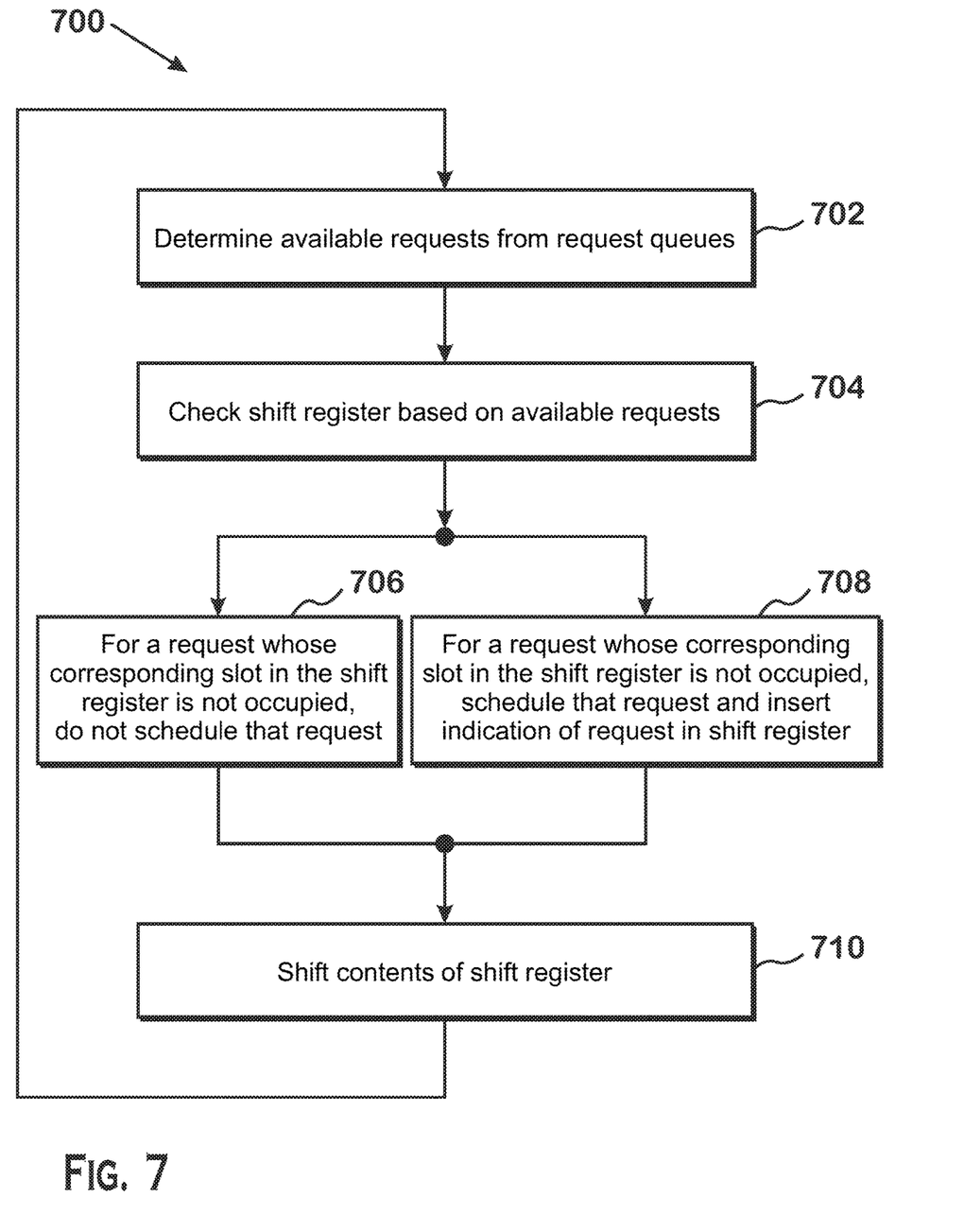
FIG. 7 is a flow diagram of a method for scheduling requests for execution in pipelines of different latencies, according to an example.

FIG. 7 is a flow diagram of a method 700 for scheduling requests for execution in pipelines of different latencies, according to an example. Although described with respect to the system of FIGS. 1-5 and 6A-6H, those of skill in the art will understand that any system, configured to perform the steps in any technically feasible order, falls within the scope of the present disclosure.

The method 700 begins at step 702, where the request arbiter 508 determines whether and what available requests exist in request queues. Example request queues are the low latency request queue 504 and the high latency request queue 506, although any number of queues, with any set of relative latencies, falls within the scope of the present disclosure. It should be understood that the maximum rate with which requests are placed into the different request queues is the same as the maximum rate with which the output from processed requests are output from the variable latency request arbiter 500. In an example, the variable latency request arbiter 500 accepts a maximum of one request per cycle and outputs a maximum of one result for a request per cycle.

At step 704, the request arbiter 508 checks the shift register based on the available requests. For each available request, the request arbiter 508 checks the slot of the shift register that corresponds to the number of cycle that the request would take to complete. If that slot is occupied, then the request arbiter 508 does not schedule the request for execution (step 706). If that slot is not occupied, then the request arbiter 508 does schedule the request for execution in the corresponding pipeline (step 708). In some implementations, only the request at the head of a request queue is considered to be available. In some implementations, no requests for a given latency are available if the corresponding request queue is empty. At step 710, the shift register 510 shifts its contents over by one slot, dropping the last request.

Note that highest latency requests are usually scheduled if available because the slot in the shift register 510 for such highest latency requests does not get occupied by any other request when the contents of the shift register 510 are shifted. Further, scheduling high latency requests often can block lower latency requests. Thus one modification to the technique described herein is to implement a mechanism whereby, if too many high latency requests are scheduled in any given time, then those requests are blocked for a period of time and thus the lower latency requests are allowed to be scheduled. In an example, a counter is maintained. The counter keeps track of the number of high latency requests that have been scheduled in a particular sliding time window (i.e., the prior X number of cycles). If this counter exceeds a threshold, then scheduling high latency requests is stopped for another period of time (such as until the counter drops down to a second threshold).

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for scheduling execution of variable latency requests, the method comprising:
    identifying an available request from a set of request queues, where at least one request queue of the set of request queues comprises a low latency request queue configured to store low latency requests for execution by a low latency processing pipeline and at least one request queue of the set of request queues comprises a high latency request queue configured to store high latency requests for execution by a high latency processing pipeline, wherein the low latency requests have lower latency than the high latency requests, wherein a latency of the request comprises a number of cycles for the request to complete;
    determining that scheduling the available request in a current cycle would not result in an output conflict with any other scheduled request of the low latency processing pipeline or the high latency processing pipeline; and
    responsive to the determining, scheduling the available request.

2. The method of claim 1, wherein:
    latency for the low latency requests comprises a number of cycles the low latency requests take to processing in a low latency processing pipeline; and
    latency for the high latency requests comprises a number of cycles the high latency requests take to processing in a high latency processing pipeline.

3. The method of claim 1, wherein:
    determining that scheduling the available request in a current cycle would not result in an output conflict with any other scheduled request of the low latency processing pipeline or the high latency processing pipeline comprises determining that a shift register slot is empty, wherein the slot is a number of slots from an end of a shift register, wherein the number of slots corresponds to the number of cycles for the request to complete.

4. The method of claim 3, wherein:
    determining that the shift register slot is empty comprises identifying a slot that is a number of slots from the end of the shift register equal to the number of cycles that the available request takes to process in a processing pipeline, and determining that the slot is empty; and
    the method further comprises writing an item into the identified slot corresponding to the available request, to indicate occupancy of that slot by the available request.

5. The method of claim 3, further comprising:
    identifying a second available request; and
    determining that scheduling the available request in a current cycle would not result in an output conflict with any other scheduled request of the low latency processing pipeline or the high latency processing pipeline, by:
    determining that a second shift register slot corresponding to the latency of the second available request is occupied; and
    refraining from scheduling the second available request for processing on the current cycle.

6. The method of claim 3, further comprising shifting the shift register on transitioning to a subsequent cycle, moving the contents of the shift register towards the end of the shift register, and dropping the final entry of the shift register.

7. The method of claim 1, wherein either or both of the latency of the high latency requests and the latency of the low latency requests are variable.

8. The method of claim 1, further comprising:
    accepting not more than one request per cycle into the low latency request queue and the high latency request queue.

9. The method of claim 1, further comprising:
    outputting not more than one processing result for one request processed by either the low latency processing pipeline or the high latency processing pipeline per cycle, so that output conflicts including more than one processing result output by the low latency processing pipeline and the high latency processing pipeline do not occur.

10. A variable latency request arbiter for scheduling execution of variable latency requests, the variable latency request arbiter comprising:
    a set of request queue circuits, where at least one request queue circuit of the set of request queue circuits comprises a low latency request queue circuit configured to store low latency requests for execution by a low latency processing pipeline and at least one request queue circuit of the set of request queue circuits comprises a high latency request queue circuit configured to store high latency requests for execution by a high latency processing pipeline, wherein the low latency requests have lower latency than the high latency requests, wherein a latency of the request comprises a number of cycles for the request to complete; and a request arbiter circuit configured to:

identify an available request from the set of request queue circuits;

determine that scheduling the available request in a current cycle would not result in an output conflict with any other scheduled request of the low latency processing pipeline or the high latency processing pipeline responsive to the determining, schedule the available request.

11. The variable latency request arbiter of claim 10, wherein:

latency for the low latency requests comprises a number of cycles the low latency requests take to processing in a low latency processing pipeline; and latency for the high latency requests comprises a number of cycles the high latency requests take to processing in a high latency processing pipeline.

12. The variable latency request arbiter of claim 10, wherein:

determining that scheduling the available request in a current cycle would not result in an output conflict with any other scheduled request of the low latency processing pipeline or the high latency processing pipeline comprises determining that a shift register slot is empty, wherein the slot is a number of slots from an end of a shift register, wherein the number of slots corresponds to the number of cycles for the request to complete.

13. The variable latency request arbiter of claim 12, wherein:

determining that the shift register slot is empty comprises identifying a slot that is a number of slots from the end of the shift register equal to the number of cycles that the available request takes to process in a processing pipeline, and determining that the slot is empty; and the request arbiter circuit is further configured to write an item into the identified slot corresponding to the available request, to indicate occupancy of that slot by the available request.

14. The variable latency request arbiter of claim 12, wherein the request arbiter circuit is further configured to:

identify a second available request; and determine that scheduling the available request in a current cycle would not result in an output conflict with any other scheduled request of the low latency processing pipeline or the high latency processing pipeline, by:

determine that a second shift register slot corresponding to the latency of the second available request is occupied; and refrain from scheduling the second available request for processing on the current cycle.

15. The variable latency request arbiter of claim 12, wherein the request arbiter circuit is further configured to shift the shift register on transitioning to a subsequent cycle move the contents of the shift register towards the end of the shift register, and drop the final entry of the shift register.

16. The variable latency request arbiter of claim 10, wherein either or both of the latency of the high latency requests and the latency of the low latency requests are variable.

17. The variable latency request arbiter of claim 10, further comprising:

a queue selector circuit configured to accept not more than one request per cycle into the low latency request queue circuit and the high latency request queue circuit.

18. The variable latency request arbiter of claim 10, further comprising:

an output merger circuit configured to output not more than one processing result for one request processed by either the low latency processing pipeline or the high latency processing pipeline per cycle, so that output conflicts including more than one processing result output by the low latency processing pipeline and the high latency processing pipeline do not occur.

19. An accelerated processing device ("APD") for scheduling execution of variable latency requests, the APD comprising:

a data requestor;

a memory; and a compression interface circuit configured to service requests from the data requestor to the memory, by:

storing the requests in a set of request queues, where at least one request queue of the set of request queues comprises a low latency request queue circuit configured to store low latency requests for execution by a low latency processing pipeline and at least one request queue of the set of request queues comprises a high latency request queue circuit configured to store high latency requests for execution by a high latency processing pipeline, wherein the low latency requests have lower latency than the high latency requests, wherein a latency of the request comprises a number of cycles for the request to complete;

identifying an available request from the set of request queues;

determining that scheduling the available request in a current cycle would not result in an output conflict with any other scheduled request of the low latency processing pipeline or the high latency processing pipeline; and responsive to the determining, scheduling the available request.

20. The APD of claim 19, wherein:

latency for the low latency requests comprises a number of cycles the low latency requests take to processing in a low latency processing pipeline; and latency for the high latency requests comprises a number of cycles the high latency requests take to processing in a high latency processing pipeline.

* * * * *